(12) United States Patent
Huang et al.

(10) Patent No.: US 11,652,717 B2
(45) Date of Patent: *May 16, 2023

(54) SIMULATION-BASED CROSS-CLOUD CONNECTIVITY CHECKS

(71) Applicant: VMware, Inc., Palo Alto, CA (US)

(72) Inventors: Qiao Huang, Beijing (CN); Donghai Han, Beijing (CN); Qiong Wang, Beijing (CN); Jia Cheng, Beijing (CN); Xiaoyan Jin, Beijing (CN); Qiaoyan Hou, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,965

(22) Filed: Jun. 24, 2021

(65) Prior Publication Data

US 2021/0399961 A1 Dec. 23, 2021

Related U.S. Application Data

(63) Continuation of application No. 16/780,859, filed on Feb. 3, 2020, now Pat. No. 11,050,647.

(51) Int. Cl.
*H04L 43/0811* (2022.01)
*H04L 12/46* (2006.01)
(Continued)

(52) U.S. Cl.
CPC ...... *H04L 43/0811* (2013.01); *G06F 9/45558* (2013.01); *G06F 9/5072* (2013.01);
(Continued)

(58) Field of Classification Search
CPC . H04L 43/0811; H04L 12/4641; H04L 45/02; H04L 61/256; H04L 63/0263; G06F 9/45558; G06F 9/5072; G06F 9/547
See application file for complete search history.

(56) References Cited

U.S. PATENT DOCUMENTS

5,987,506 A * 11/1999 Carter .................... H04L 67/00
711/E12.066
9,058,229 B2 * 6/2015 Locker .................... G06F 8/60
(Continued)

*Primary Examiner* — William G Trost, IV
*Assistant Examiner* — Adam A Cooney
(74) *Attorney, Agent, or Firm* — Su IP Consulting (57) ABSTRACT

Example methods and systems are provided for simulation-based cross-cloud connectivity checks. One example method may include injecting a connectivity check packet in a first cloud environment, and obtaining first report information associated with a first stage of forwarding the connectivity check packet from one or more first observation points in the first cloud environment. The method may also comprise: based on configuration information associated with one or more second observation points in the second cloud environment, simulating a second stage of forwarding the connectivity check packet towards a second virtualized computing instance via the one or more second observation points. The method may further comprise: generating second report information associated with the simulated second stage to identify a connectivity status between a first virtualized computing instance and the second virtualized computing instance based on the first report information and the second report information.

21 Claims, 6 Drawing Sheets

(51) Int. Cl.
   *G06F 9/455* (2018.01)
   *H04L 9/40* (2022.01)
   *G06F 9/50* (2006.01)
   *H04L 61/256* (2022.01)
   *G06F 9/54* (2006.01)
   *H04L 45/02* (2022.01)

(52) U.S. Cl.
   CPC .......... *G06F 9/547* (2013.01); *H04L 12/4641* (2013.01); *H04L 45/02* (2013.01); *H04L 61/256* (2013.01); *H04L 63/0263* (2013.01)

(56) References Cited

U.S. PATENT DOCUMENTS

| | | |
|---|---|---|
| 9,497,107 B1 | 11/2016 | Akiya et al. |
| 10,778,659 B2 | 9/2020 | Tola et al. |
| 2011/0179136 A1 | 7/2011 | Twitchell, Jr. |
| 2011/0295998 A1 | 12/2011 | Ferris et al. |
| 2012/0017265 A1 | 1/2012 | Twitchell, Jr. |
| 2013/0297769 A1 | 11/2013 | Chang et al. |
| 2013/0332588 A1 | 12/2013 | Maytal et al. |
| 2014/0082177 A1 | 3/2014 | Lemire et al. |
| 2014/0108665 A1 | 4/2014 | Arora et al. |
| 2014/0181319 A1 | 6/2014 | Chen et al. |
| 2014/0365549 A1 | 12/2014 | Jenkins |
| 2015/0009990 A1 | 1/2015 | Sung et al. |
| 2015/0009991 A1 | 1/2015 | Sung et al. |
| 2015/0341240 A1 | 11/2015 | Iyoob et al. |
| 2016/0080221 A1* | 3/2016 | Ramachandran ... H04L 12/4633 709/224 |
| 2016/0080230 A1 | 3/2016 | Anand et al. |
| 2016/0105393 A1* | 4/2016 | Thakkar ................ H04L 67/125 709/220 |
| 2017/0060628 A1* | 3/2017 | Tarasuk-Levin .... H04L 63/0209 |
| 2017/0078176 A1 | 3/2017 | Lakshmikantha |
| 2017/0083354 A1 | 3/2017 | Thomas et al. |
| 2017/0371696 A1 | 12/2017 | Prziborowski et al. |
| 2018/0270130 A1 | 9/2018 | Wang et al. |
| 2019/0020588 A1 | 1/2019 | Twitchell, Jr. |
| 2019/0028424 A1 | 1/2019 | Mittal et al. |
| 2019/0059117 A1* | 2/2019 | Shu ....................... H04W 76/19 |
| 2019/0222440 A1* | 7/2019 | Huang ................ H04L 63/0272 |
| 2020/0145299 A1 | 5/2020 | Do et al. |
| 2020/0252205 A1 | 8/2020 | Padmanabhan |
| 2021/0014142 A1 | 1/2021 | Huang et al. |
| 2021/0184953 A1 | 6/2021 | Huang et al. |

* cited by examiner

SIMULATION-BASED CROSS-CLOUD CONNECTIVITY CHECKS

CROSS-REFERENCE TO RELATED APPLICATIONS

The present application is a continuation under 35 U.S.C. § 120 of U.S. patent application Ser. No. 16/780,859, filed Feb. 3, 2020, now issued as U.S. Pat. No. 11,050,647, which claims the benefit under 35 U.S.C. § 119(a) of Patent Cooperation Treaty (PCT) Application No. PCT/CN2019/125582, filed Dec. 16, 2019. The aforementioned U.S. Patent Application and PCT application are incorporated herein by reference.

BACKGROUND

Virtualization allows the abstraction and pooling of hardware resources to support virtual machines in a software-defined data center (SDDC). For example, through server virtualization, virtualization computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, a user (e.g., organization) may run VMs using on-premise data center infrastructure that is under the user's private ownership and control. Additionally, the user may run VMs in the cloud using infrastructure under the ownership and control of a public cloud provider. Since various network issues may affect traffic among VMs deployed in different cloud environments, it is desirable to perform network troubleshooting and diagnosis to identify those issues.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to network troubleshooting and diagnosis will now be explained in more detail using FIG. 1, which is a schematic diagram illustrating example software-defined networking (SDN) environment 100 in which simulation-based cross-cloud connectivity check may be performed. It should be understood that, depending on the desired implementation, SDN environment 100 may include additional and/or alternative components than that shown in FIG. 1.

Figure 1:
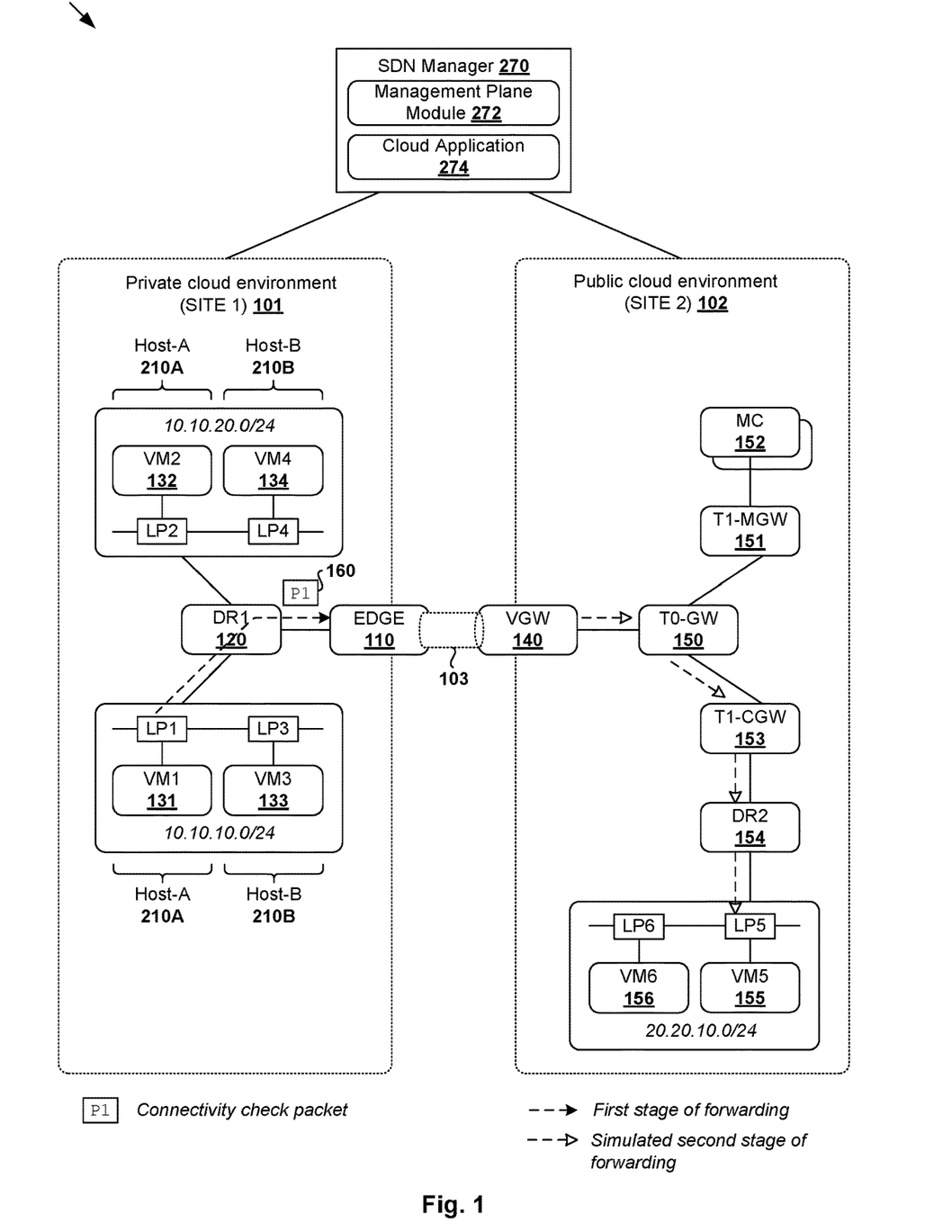
FIG. 1 is a schematic diagram illustrating example software-defined networking (SDN) environment in which simulation-based cross-cloud connectivity checks may be performed.

In the example in FIG. 1, SDN environment 100 spans across multiple geographical sites, such as a first geographical site where private cloud environment 101 ("first cloud environment") is located, a second geographical site where public cloud environment 102 ("second cloud environment") is located, etc. In practice, the term "private cloud environment" may refer generally to an on-premise data center or cloud platform supported by infrastructure that is under an organization's private ownership and control. In contrast, the term "public cloud environment" may refer generally a cloud platform supported by infrastructure that is under the ownership and control of a public cloud provider. Although the terms "first" and "second" are used to describe various elements, these elements should not be limited by these terms. These terms are used to distinguish one element from another. For example, a first element may be referred to as a second element, and vice versa.

In practice, a public cloud provider is generally an entity that offers a cloud-based platform to multiple users or tenants. This way, a user may take advantage of the scalability and flexibility provided by public cloud environment 102 for data center capacity extension, disaster recovery, etc. Depending on the desired implementation, public cloud environment 102 may be implemented using any suitable cloud technology, such as Amazon Web Services® (AWS) and Amazon Virtual Private Clouds (VPCs); VMware Cloud™ on AWS; Microsoft Azure®; Google Cloud Platform™; IBM Cloud™; a combination thereof, etc. Amazon VPC and Amazon AWS are registered trademarks of Amazon Technologies, Inc.

EDGE 110 is deployed at the edge of private cloud environment 101 to handle traffic to and from public cloud environment 102. Here, EDGE 110 may be implemented using one or more virtual machines (VMs) and/or physical machines (also known as "bare metal machines"), and capable of performing functionalities of a switch, router (e.g., logical service router), bridge, gateway, edge appliance, or any combination thereof. This way, virtual machines (VMs) such as 131-134 in private cloud environment 101 may connect with public cloud environment 102 via EDGE 110.

Figure 2:
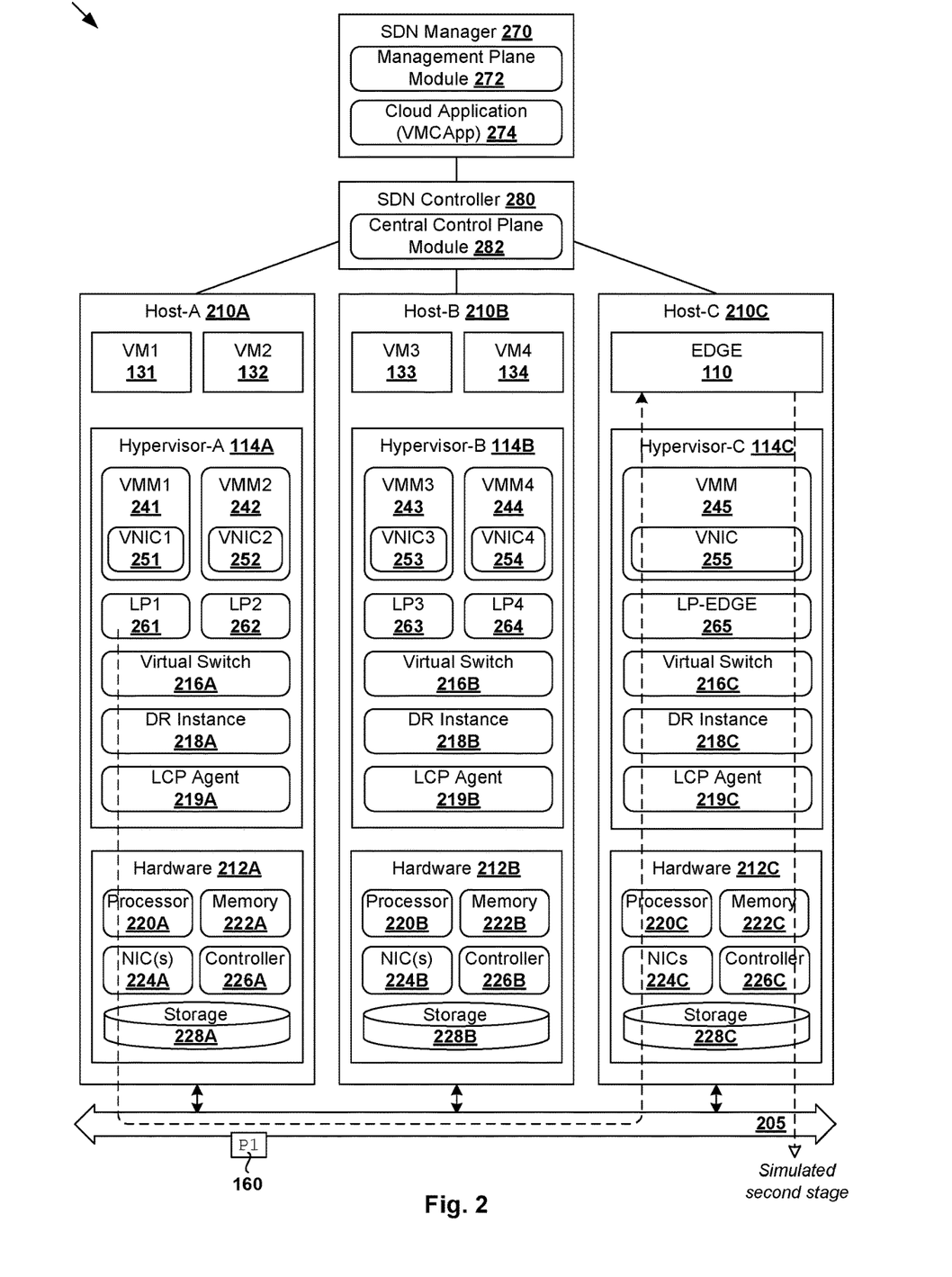
FIG. 2 is a schematic diagram illustrating a physical implementation view of an example cloud environment in FIG. 1.

VMs 131-134 will be explained in more detail using FIG. 2, which is a schematic diagram illustrating physical implementation view 200 of example cloud environment 101 in FIG. 1. Depending on the desired implementation, physical implementation view 200 may include additional and/or alternative component(s) than that shown in FIG. 2. In this example, VMs 131-132 are supported by host-A 210A, VMs 133-134 by host-B 210B and EDGE 110 (i.e., a VM) by host-C 210C. Hosts 210A-C (also known as "end hosts,"

"computing devices", "host computers", "host devices", "physical servers", "server systems", "physical machines," "transport nodes," etc.) are interconnected via physical network 205.

Hosts 210A-C may each include virtualization software (e.g., hypervisor 214A/214B/214C) that maintains a mapping between underlying hardware 212A/212B/212C and virtual resources allocated to VMs 131-134 and EDGE 110. Hardware 212A/212B/212C includes suitable physical components, such as processor(s) 220A/220B/220C; memory 222A/222B/222C; physical network interface controller(s) or NIC(s) 224A/224B/224C; and storage disk(s) 228A/228B/228C accessible via storage controller(s) 226A/226B/226C, etc. Virtual resources are allocated to each VM to support a guest operating system (OS) and applications (not shown for simplicity).

Corresponding to hardware 212A/212B/212C, the virtual resources may include virtual CPU, guest physical memory, virtual disk, virtual network interface controller (VNIC), etc. Hardware resources may be emulated using virtual machine monitors (VMMs) 241-245, which may be considered as part of (or alternatively separated from) corresponding VMs 131-134. For example in FIG. 2, VNICs 251-254 are virtual network adapters that are emulated by corresponding VMMs 241-244. In practice, physical network 205 may be formed by various intermediate network devices, such as physical network devices (e.g., physical switches, physical routers, etc.) and/or logical network devices (e.g., logical switches, logical routers, etc.).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 214A/214B/214C implements virtual switch 216A/216B/216C and logical distributed router (DR) instance 218A/218B/218C to handle egress packets from, and ingress packets to, corresponding VMs 131-134, 110. In the example in FIG. 2, logical switches and logical DRs may be implemented in a distributed manner and can span multiple hosts to connect VMs 131-134, 110. For example, logical switches that provide logical layer-2 connectivity may be implemented collectively by virtual switches 216A-C and represented internally using forwarding tables (not shown) at respective virtual switches 216A-C. The forwarding tables may each include entries that collectively implement the respective logical switches. Further, logical DRs that provide logical layer-3 connectivity may be implemented collectively by DR instances 218A-C and represented internally using routing tables (not shown) at respective DR instances 218A-C. The routing tables may each include entries that collectively implement the respective logical DRs.

Packets may be received from, or sent to, each VM via an associated logical port. For example, logical ports 261-265 are associated with respective VMs 131-134, EDGE 110. Here, the term "logical port" may refer generally to a port on a logical switch to which a virtualized computing instance is connected. A "logical switch" may refer generally to an SDN construct that is collectively implemented by virtual switches 216A-C in FIG. 2, whereas a "virtual switch" may refer generally to a software switch or software implementation of a physical switch. In practice, there is usually a one-to-one mapping between a logical port on a logical switch and a virtual port on virtual switch 216A/216B/216C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through virtualization of networking services, logical overlay networks (also known as "logical network") may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. VM1 131 on host-A 210A and VM3 133 on host-B 210B may be connected to the same logical switch, and the same logical layer-2 segment associated with first subnet=10.10.10.0/24. In another example, VM2 132 and VM4 134 may deployed on the same segment associated with second subnet=10.10.20.0/24. Both segments may be connected to a common logical DR1 120, which may be implemented using DR instances 218A-C spanning hosts 210A-C.

Hosts 210A-C may maintain data-plane connectivity with other host(s) via physical network 104 to facilitate communication among VMs 131-134 and EDGE 110. Hypervisor 214A/214B/214C may implement a virtual tunnel endpoint (VTEP) to encapsulate and decapsulate packets with an outer header (also known as a tunnel header) identifying the relevant logical overlay network (e.g., VNI=6000). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B) and hypervisor-C 114C implements a third VTEP with (IP-C, MAC-C, VTEP-C). Encapsulated packets may be sent via an end-to-end, bi-directional communication path (known as a tunnel) between a pair of VTEPs over physical network 205.

SDN controller 280 and SDN manager 270 are example network management entities that facilitate management of various entities deployed in cloud environment 101/102. An example SDN controller is the NSX controller component of VMware NSX® (available from VMware, Inc.) that resides on a central control plane (CCP), and connected to SDN manager 270 (e.g., NSX manager) on a management plane (MP). See also CCP module 282 and MP module 272. Management entity 270/280 may be implemented using physical machine(s), virtual machine(s), a combination thereof, etc. Management entity 270/280 may maintain control-plane connectivity with local control plane (LCP) agent 219A/219B/219C on each host to exchange control information.

Conventionally, to perform a connectivity check between VM1 131 and VM3 133, a special packet (e.g., connectivity check packet) may be injected by management entity 270/280 at host-A 210A for transmission to host-B 210B within the same cloud environment 101. The special packet may include an inner packet that is encapsulated with an outer header. The inner packet may be addressed from VM1 131 (e.g., source IP-1) to VM3 133 (e.g., destination IP-3). The outer header may of the connectivity check packet may include address information of source host-A 210A (e.g., VTEP IP-A) and destination host-B 210B (e.g., VTEP IP-B). This way, the transmission of the connectivity check packet may be monitored to detect any network connectivity issue.

However, for destinations that are external to private cloud environment 101, EDGE 110 may drop such special packets that are injected for connectivity checks because they are not supported in public cloud environment 102. In this case, it is more challenging for network administrators to diagnose any cross-cloud network connectivity issues, such as between VM1 131 in private cloud environment 101 and VM5 155 in public cloud environment 102. As the scale and complexity of cloud environments 101-102 increases, network troubleshooting and debugging may become increasingly time- and resource-consuming. This may in turn increase system downtime due to undiagnosed performance issues.

Simulation-Based Cross-Cloud Connectivity Checks

According to examples of the present disclosure, network troubleshooting and diagnosis may be improved by extending the connectivity check functionality to cross-cloud environments. Instead of necessitating an end-to-end forwarding of connectivity check packets from private cloud environment 101 to public cloud environment 102, one stage of the forwarding may be simulated. As used herein, the term "simulation-based" may refer generally to an approach of emulating the forwarding of a connectivity check packet via observation point(s). The simulation may be performed based on configuration information that controls the actual behavior of the observation point(s) in the physical world. This way, even if EDGE 110 drops connectivity check packets that are destined for public cloud environment 102, cross-cloud connectivity checks may be performed to facilitate network troubleshooting.

Throughout the present disclosure, public cloud environment 102 will be exemplified using VMware Cloud™ on AWS. It should be understood that any additional and/or additional cloud technology may be implemented. In the example in FIG. 1, EDGE 110 is connected with public cloud environment 102 via a virtual gateway 140 (VGW) that is connected with tier-1 management gateway 151 (labelled "T1-MGW") and tier-1 compute gateway 153 (labelled "T1-CGW") via tier-0 gateway 150 (labelled "T0-GW"). In practice, T0-GW 150, MGW 151 and CGW 153 may be logical constructs that are implemented by an edge appliance in public cloud environment 102.

T1-MGW 151 may be deployed to handle management-related traffic to and/or from management component(s) 152 (labelled "MC") for managing various entities within public cloud environment 102. T1-CGW 153 may be deployed to handle workload-related traffic to and/or from VMs, such as VM5 155 and VM6 156 on 20.20.20.20/24. EDGE 110 in private cloud environment 101 may communicate with VGW 140 in public cloud environment 102 using any suitable tunnel(s) 103, such as Internet Protocol Security (IPSec), layer-2 virtual private network (L2VPN), direct connection, etc.

Figure 3:
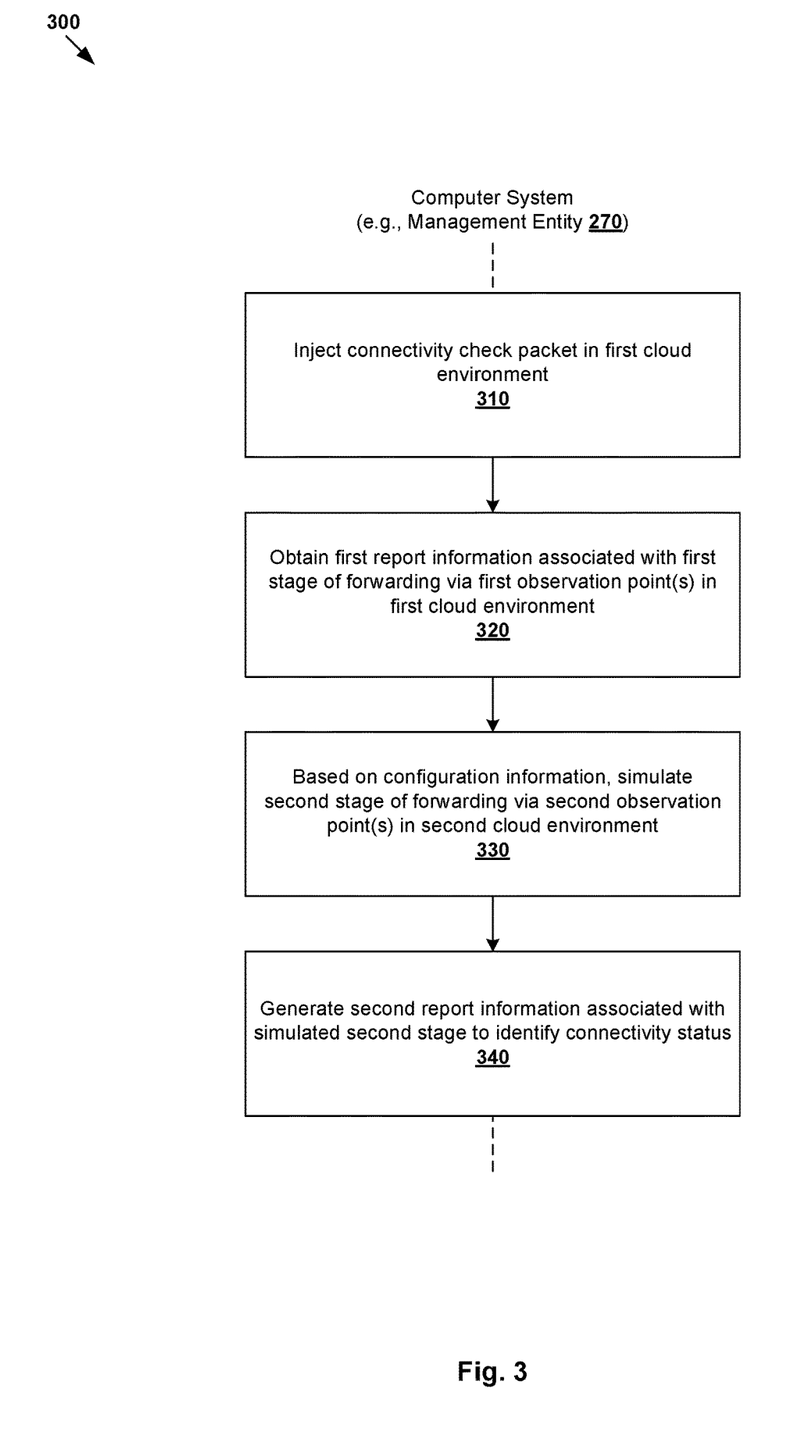
FIG. 3 is a flowchart of an example process for a network device to perform simulation-based cross-cloud connectivity check in an SDN environment.

In more detail, FIG. 3 is a flowchart of example process 300 for network device 110 to perform simulation-based cross-cloud connectivity check in SDN environment 100. Example process 300 may include one or more operations, functions, or actions illustrated by one or more blocks, such as 310 to 340. The various blocks may be combined into fewer blocks, divided into additional blocks, and/or eliminated depending on the desired implementation. In the following, various examples will be discussed using management entity 270 as an example "computer system," private cloud environment 101 as an example "first cloud environment," public cloud environment 102 as an example "second cloud environment," VM1 131 as an example "first virtualized computing instance" or "first endpoint," VM5 155 as an example "second virtualized computing instance" or "second endpoint," etc.

At 310 in FIG. 3, a connectivity check packet (see "P1" 160 in FIG. 1) may be injected for forwarding from VM1 131 in private cloud environment 101 to VM5 155 in public cloud environment 102. At 320, first report information associated with a first stage of forwarding "P1" 160 in private cloud environment 101 may be received. The first report information may be obtained from first observation point(s) via which connectivity check packet 160 is forwarded from VM1 131, such as LP1 261, DR1 120 and EDGE 110. Here, the term "obtain" may refer generally to receiving or retrieving the information.

At 330 in FIG. 3, based on configuration information associated with second observation point(s) in public cloud environment 102, a second stage of forwarding "P1" 160 towards VM5 155 via second observation point(s) may be simulated. At 340 in FIG. 3, second report information associated with the simulated second stage may be generated. This way, based on the first report information and the second report information, a connectivity status between VM1 131 and VM5 155 may be identified, such as to determine whether there is a connectivity issue. If yes, a location at which the connectivity issue occurs along the datapath between VM1 131 and VM5 155 may also be identified.

As used herein, the term "observation point" may refer generally to any suitable entity or node that is located along a datapath between a pair of virtualized computing instances (e.g., source VM1 131 and destination VM5 155). A first or second observation point may be a logical entity, such as a logical switch port, logical router port, VNIC, distributed firewall (DFW), logical forwarding element (e.g., logical switch, logical router), gateway, downlink interface, uplink interface, etc. A combination of physical and logical entities may be used as observation points. For example, a physical entity may be a physical host, physical switch, physical router, physical port, etc. In the example in FIG. 1, first observation points in private cloud environment 101 may include LP1 261, DR1 120 and EDGE 110. Second observation points in public cloud environment 102 may include VGW 140, T0-GW 150, T1-CGW 153, DR2 154 and LP5 connected with VM5 155.

Using examples of the present disclosure, any cross-cloud connectivity issues affecting cloud environments 101-102 may be identified. Depending on the desired implementation, the term "configuration information" may refer generally to any suitable information based on which real-world behavior(s) of second observation point(s) may be simulated. As will be discussed using FIGS. 4-6, the configuration information may be obtained by generating and sending a query to a cloud application (see 274 in FIG. 1 and FIG. 2). In practice, the "cloud application" (e.g., VMC App for VMware Cloud) may be a software component supported by SDN manager 270, or a different physical machine. Cloud application 274 may represent a management component accessible by users (e.g., network administrators) to control or configure entities in public cloud environment 102.

The configuration information may include one or more of the following: firewall rule information, routing table information, network address translation (NAT) configuration information, security configuration information (e.g., virtual private network (VPN) configuration), virtual distributed router (VDR) configuration information, etc. Block 330 may involve determining whether the connectivity check packet would be received, forwarded or dropped by a particular second observation point. Various examples will be described using FIGS. 4-6 below.

First Example

Figure 4:
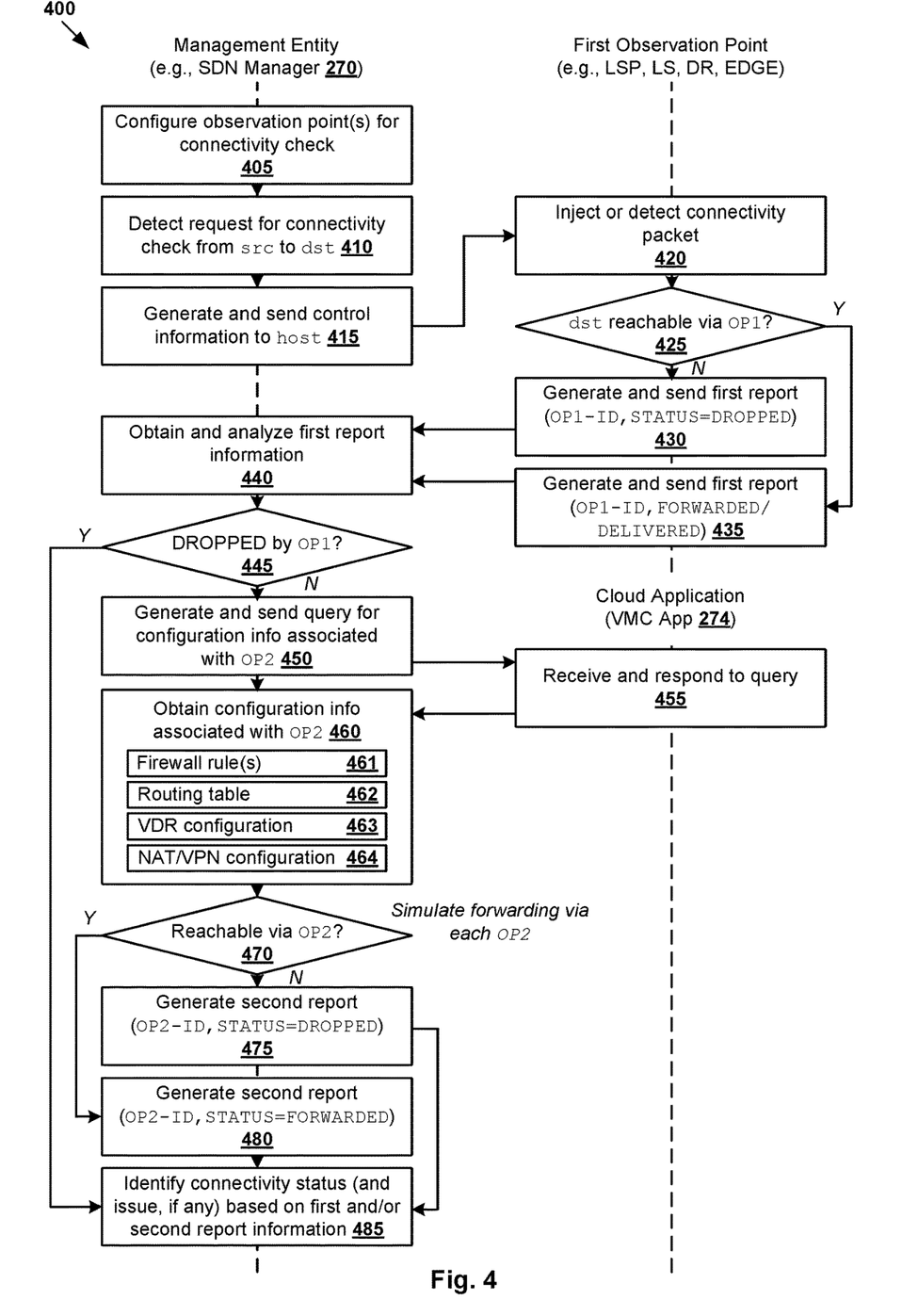
FIG. 4 is a flowchart of an example detailed process for simulation-based cross-cloud connectivity check in an SDN environment.

FIG. 4 is a flowchart of example detailed process 400 for simulation-based cross-cloud connectivity check in SDN environment 100. Example process 400 may include one or more operations, functions, or actions illustrated at 405 to 485. The various operations, functions or actions may be combined into fewer blocks, divided into additional blocks, and/or eliminated depending on the desired implementation. The example in FIG. 4 will be explained using FIG. 5, which is a schematic diagram illustrating first example 500 of simulation-based cross-cloud connectivity check in SDN environment 100.

In the following, consider a cross-cloud connectivity check between VM1 131 on host-A 210A in private cloud environment 101 and VM5 155 in public cloud environment 102. In practice, any suitable approach may be used to inject connectivity check packets. For example, a tool called Traceflow (available from VMware, Inc.) may be extended to support simulation-based cross-cloud connectivity checks.

(a) Connectivity Check Configuration

At 405 in FIG. 4, any suitable observation point(s) may be configured to facilitate cross-cloud connectivity check in cloud environment 101. In practice, any first observation point(s) within private cloud environment 101 may be configured to generate and send first report information. For example, each first observation point may send report information or path information specifying (ID, STATUS). The "ID" may include any suitable information identifying its sender, such as a unique ID, name, element type, element sub-type, or any combination thereof. The "ID" may also indicate a tier-0 or tier-1 associated with a logical router. The "STATUS" may be "RECEIVED," "FORWARDED," "DELIVERED," "DROPPED," etc. Where applicable, the first report information may also include a timestamp, transport node information (e.g., host ID, name and type), VTEP information (e.g., VTEP label), IP address information (e.g., remote and local IP addresses), logical overlay network information (e.g., VNI), etc.

At 410 in FIG. 4, SDN manager 270 receives a user's request to perform a cross-cloud connectivity check between VM1 131 deployed in private cloud environment 101 and VM5 155 deployed in public cloud environment 102. This is to trace a datapath between VM1 131 and VM5 155 to determine their connectivity status. The request may be received from a user device (e.g., operated by a network administrator) via any suitable interface supported by SDN manager 270, such as graphical user interface (GUI), command-line interface (CLI), application programming interface (API) calls, etc.

At 415 in FIG. 4, in response to receiving the user's request, SDN manager 270 identifies transport node=host-A 210A supporting VM1 131. To identify host-A 210A, SDN manager 270 (e.g., using management plane module 272) may generate and send a query to SDN controller 280 (e.g., central control plane 282) to locate VM1 131. To inject a connectivity check packet, SDN manager 270 may generate and send control information (see "C" 503 in FIG. 5) to instruct host-A 210A to inject a connectivity check packet at logical port=LP1 261 associated with source VM1 131 for transmission to destination VM5 155.

(b) First Stage of Forwarding

At 420 in FIG. 4, in response to receiving control information 503 from SDN manager 270, host-A 210A injects the connectivity check packet (labelled "P1" 510 in FIG. 5) at logical port=LP1 261. In one example, packet "P1" 510 may be generated by SDN manager 270. In this case, control information 503 at block 415 includes packet "P1" 510 and an instruction for host-A 210A to inject it at logical port=LP1 151. Alternatively, control information 503 may be an instruction for host-A 210A to generate and inject the packet.

Figure 5:
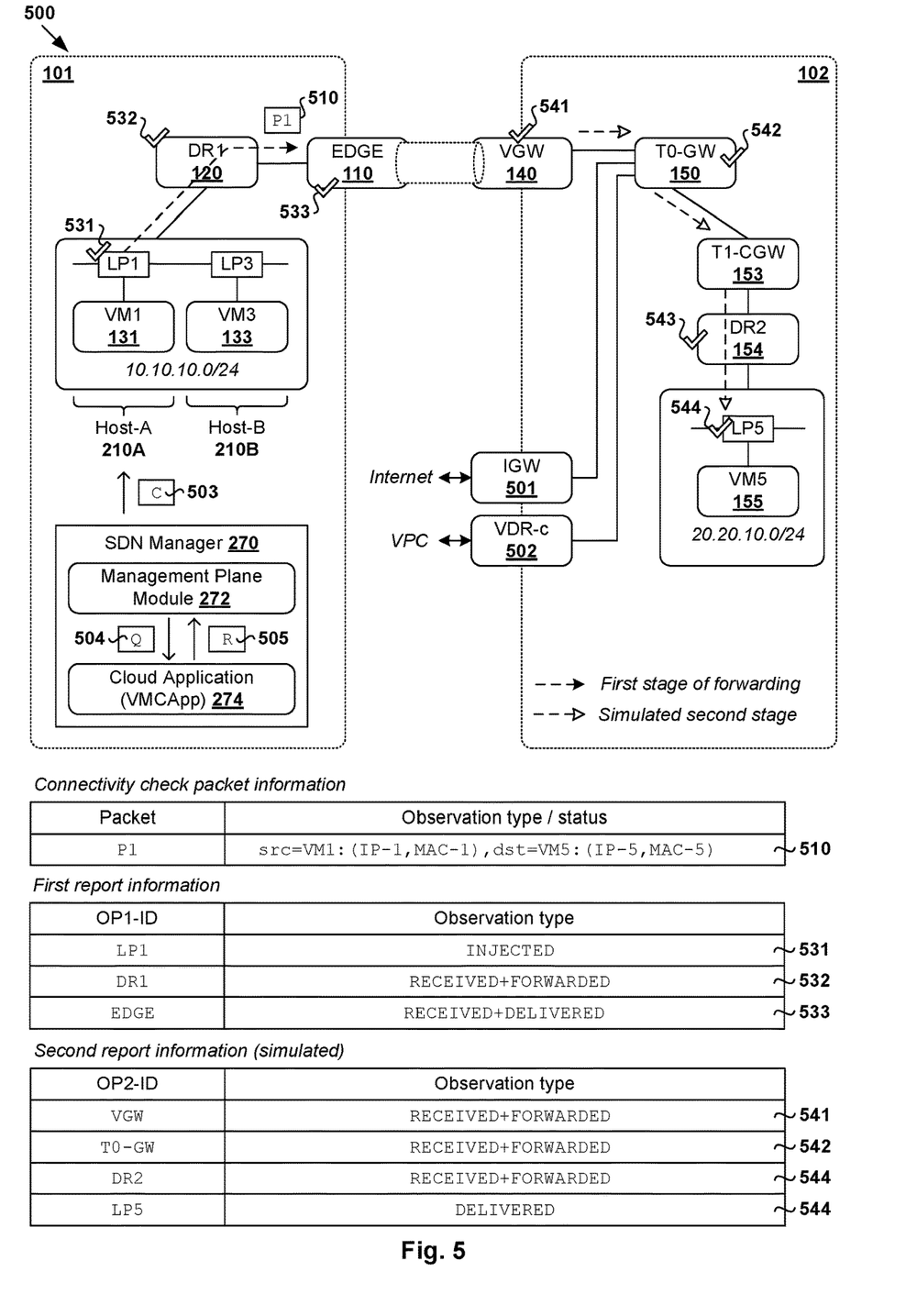
FIG. 5 is a schematic diagram illustrating a first example of cross-cloud connectivity check in an SDN environment.

In the example in FIG. 5, connectivity check packet "P1" 510 includes an inner packet specifying source information (IP address=IP-1, MAC address=MAC-1) associated with VM1 131, and destination information (IP-5, MAC-5) associated with VM5 155. Depending on the desired implementation, host-A 210A and host-C 210C may be connected via a logical overlay network. In this case, to reach EDGE 110 supported by host-C 210C, packet "P1" 510 may be encapsulated with an outer header (e.g., GENEVE encapsulation) specifying source information (VTEP IP address=IP-A, MAC address=MAC-A) associated with host-A 210A, and destination information (IP-C, MAC-C) associated with host-C 210C.

At 425 and 430 in FIG. 4, in response to detecting packet "P1" 510, first observation points in private cloud environment 101 may each check the reachability of destination (IP-5, MAC-5) specified by packet "P1" 510. At 435, if the destination is reachable, first report information indicating STATUS=FORWARDED or DELIVERED (towards private cloud environment 102) will be generated and sent to SDN manager 270. Otherwise, at 440 (unreachable), first report information indicating (ID, STATUS=DROPPED) will be generated and sent to SDN manager 270.

EDGE 110 may determine whether a destination located in private cloud environment 102 is reachable by generating and sending a query to SDN manager 270. Using VMware Cloud for example, EDGE 110 may generate and send a query to SDN manager 270 to check whether a VMC App (example "cloud application" 274) associated with private cloud environment 102 is found in a configuration file. If reachable based on a response from SDN manager 270, EDGE 110 may generate and send first report information specifying (ID=EDGE, STATUS=RECEIVED+DELIVERED). Otherwise, if unreachable, EDGE 110 may generate and send first report information specifying (ID=EDGE, STATUS=RECEIVED+DROPPED) to report the packet drop.

In the example in FIG. 5, SDN manager 270 may receive first report information 531-533 from various first observation points within private cloud environment 101. At 531, LP1 261 connected to VM1 131 reports (ID=LP1, STATUS=INJECTED) to SDN manager 270. At 532, DR1 120 reports (ID=DR1, STATUS=RECEIVED+FORWARDED). At 533, (ID=EDGE, STATUS=RECEIVED+DELIVERED) is received from EDGE 110. In other words, first report information 531-533 indicates no connectivity issue in private cloud environment 101.

(c) Simulated Second Stage of Forwarding

At 440 and 445 in FIG. 4, in response to receiving first report information associated with a first stage of forwarding "P1" 510 from VM1 131 via first observation points, SDN manager 270 may analyze the first report information to determine whether "P1" 510 has been dropped in private cloud environment 101. If dropped, it is not necessary to simulate a second stage of forwarding "P1" 510 towards VM5 155. In the example in FIG. 5, SDN manager 270 may determine that simulation is required because packet "P1" 510 has not been dropped based on first report information 531-533 from respective LP1 261, DR1 120 and EDGE 110.

At 450 in FIG. 4, in response to determination that "P1" 510 has not been dropped and therefore a simulation is required, SDN manager 270 may obtain configuration information associated with second observation point(s) deployed in public cloud environment 102. In the example in FIG. 5, block 450 may involve SDN manager 270 generating and sending a query (see 504) to cloud application 274. At 455, in response to receiving query 504, cloud application 274 may send configuration information (see "R" 505) to SDN manager 270. In practice, cloud application 274 and SDN manager 270 may be supported by the same physical machine, in which case query 504 may be sent internally and directly. In this case, query 504 may be generated and sent by invoking an API call supported by cloud application 274. Alternatively, cloud application 274 may be supported by a different physical machine.

Any suitable parameters associated with the connectivity check may be specified in query 504 (e.g., API call), such as source address information (IP-1, MAC-1) associated with VM1 131, destination address information (IP-5, MAC-5) associated with VM5 155, protocol, source port number, destination port number, uplink interface ID connecting cloud environments 101-102, direction of communication (IN for ingress, or OUT for egress towards public cloud environment 102), or any combination thereof. In practice, cloud application 274 may not send a response to SDN manager 270 when there is no public cloud environment 102 (e.g., VMware Cloud) connected to EDGE 110. If there is no response, no simulation will be performed.

At 460 in FIG. 4, SDN manager 270 may obtain configuration information 505 from cloud application 274. In the example in FIG. 5, second observation points located on a datapath leading towards VM5 155 may include VGW 140, T0-GW 150, T1-CGW1 153, DR2 154 and a logical switch port labelled "LP5." Depending on the desired implementation, any additional and/or alternative second observation points may be used. For example, in the case of AWS, elastic network interfaces (ENI) and virtual distributed router (VDR or VDR-p, where p=public) may be configured as second observation points.

Configuration information 505 may include any suitable information based on which real-world behavior of second observation point(s) may be simulated or predicted. For example, configuration information 505 may include firewall rule information, routing table information, network address translation (NAT) settings, security configuration information (e.g., virtual private network (VPN) settings, virtual distributed router (VDR) configuration information, or any combination thereof. See corresponding 461-464 in FIG. 4. Firewall configuration information may specify firewall rules configured on a particular second observation point. Each firewall rule may define a set of match criteria (e.g., packet header information) and an action (e.g., allow or deny). Routing table information specifying a set of routes reachable from a particular second observation point. Each route in a routing table may define a destination network (e.g., a subnet) and a target interface that is connected with the destination network.

At 470 in FIG. 4, based on configuration information 505 from cloud application 274, SDN manager 270 may simulate a second stage of forwarding packet "P1" 510 towards VM5 155 and generate second report information. The simulation may involve, based on configuration information 505, predicting whether packet "P1" 510 would encounter any connectivity issue when being forwarded towards VM5 155 via a set of second observation points that includes VGW 140, T0-GW 150, T1-CGW1 153, DR2 154 and LP5 connected to VM5 155. If reachable, second report information specifying (ID, STATUS=FORWARDED) may be generated at block 475. Otherwise, second report information specifying (ID, STATUS=DROPPED) may be generated at block 480.

For example, based on firewall configuration information, block 470 may involve evaluating whether "P1" 510 will be allowed or blocked (and therefore dropped) by a firewall rule at a particular second observation point. In another example, block 470 may involve determining whether a route towards VM5 155 is found in the routing table information of a particular second observation point. Further, based on VDR configuration information, SDN manager 270 may determine whether a VDR, VDR uplink or VDR downlink is configured to reach VM5 155. In practice, a VDR may be located on EDGE 110 and in public cloud environment 102.

In the example in FIG. 5, SDN manager 270 may generate second report information 541-544 associated with the simulated second stage. At 541, VGW 140 is simulated to have no connectivity issue and report (ID=VGW, STATUS=RECEIVED+FORWARDED). At 542, T0-GW 150 is simulated to report (ID=T0-GW, STATUS=RECEIVED+FORWARDED). At 543, DR2 154 is simulated to report (ID=DR2, STATUS=RECEIVED+FORWARDED). At 544, LP5 is simulated to report (ID=LP5, STATUS=DELIVERED).

Based on first report information 531-533, no connectivity issue is detected in private cloud environment 101. Based on the simulation and second report information 541-544, no connectivity issue is detected in public cloud environment 102. As such, SDN manager 270 may associate the datapath between VM1 131 and VM5 155 with cross-cloud connectivity status=CONNECTED. See also 485 in FIG. 4. Users (e.g., network administrators) may access the result of the simulation-based cross-cloud connectivity check via any suitable user interface supported by SDN manager 270.

Second Example

A second example where a connectivity issue is simulated will be explained using FIG. 6, which is a schematic diagram illustrating second example 600 of cross-cloud connectivity check in SDN environment 100. Consider a cross-cloud connectivity check between a different pair of endpoints, particularly VM3 133 ("first virtualized computing instance") and VM6 156 ("second virtualized computing instance").

(a) First Stage of Forwarding

In response to receiving control information (see "C" 601 in FIG. 6) from SDN manager 270 via SDN controller 280, host-B 210B supporting VM3 133 may inject connectivity check packet "P2" 610 at LP3 263. Packet "P2" 610 includes an inner packet specifying source information (IP address=IP-3, MAC address=MAC-3) associated with VM3 133, and destination information (IP-6, MAC-6) associated with VM6 156. To reach EDGE 110, packet "P2" 610 may be encapsulated with an outer header (e.g., GENEVE) specifying source information (VTEP IP address=IP-B, MAC address=MAC-B) associated with host-B 210B, and destination information (IP-C, MAC-C) associated with host-C 210C. See 410-420 in FIG. 4.

SDN manager 270 may receive first report information 631-633 from various first observation points within private cloud environment 101. At 631, LP3 263 connected to VM3 133 reports (ID=LP3, STATUS=INJECTED) to SDN manager 270. At 632, DR1 120 reports (ID=DR1, STATUS=RECEIVED+FORWARDED). At 533, (ID=EDGE, STATUS=RECEIVED+DELIVERED) is received from EDGE 110. In other words, first report information 631-633 indicates no connectivity issue in private cloud environment 101. See 425-440 in FIG. 4.

(b) Simulated Second Stage

Based on first report information 631-633, SDN manager 270 may determine that there is no connectivity issue in private cloud environment 101 and a simulation is required. Similarly, SDN manager 270 may invoke an API call supported by cloud application 274 (see query "Q" 602) to obtain configuration information (see "R" 603) from cloud application 274. Configuration information 603 is associated with second observation points in private cloud environment 102, including VGW 140, T0-GW 150, T1-CGW1 153, DR2 154 and LP6 connected to VM6 156. See 440-460 in FIG. 4.

Based on configuration information 603, SDN manager 270 may perform a simulation to identify any connectivity issue in public cloud environment 102. Second report information 641-643 associated with the simulated second stage is also generated. At 641, VGW 140 is simulated to have no connectivity issue and report (ID=VGW, STATUS=RECEIVED+FORWARDED). At 642, T0-GW 150 is simulated to report (ID=T0-GW, STATUS=RECEIVED+FORWARDED).

However, at 643, T1-CGW 153 is simulated to drop "P2" 620 and report (ID=T1-CGW, DROPPED). The reason for dropping packet "P2" 620 may be included in report information 643, such as "blocked by firewall," etc. In practice, VM6 156 may be unreachable for various reasons, such as firewall rule, power failure, hardware failure, software failure, network failure or congestion, a combination thereof, etc. For example, the drop reason may indicate a VDR-related problem, such as "no VDR found," "no VDR on host," "no route table found," "no VDR uplink," "no VDR downlink," or any combination thereof.

Based on first report information 631-633, no connectivity issue is detected in private cloud environment 101. Based on the simulation and second report information 641-643, a connectivity issue is detected in public cloud environment 102. As such, SDN manager 270 may associate the datapath between VM3 133 and VM6 166 with cross-cloud connectivity status=DISCONNECTED. See also 485 in FIG. 4.

Although exemplified using cross-cloud connectivity checks from private cloud environment 101 to public cloud environment 102, it should be understood that examples of the present disclosure may be implemented for the reverse path. In this case, simulation may be performed to identify any connectivity issue associated with a datapath from source VM5 155 or VM6 156 in public cloud environment 102. A connectivity check packet may be injected in private cloud environment 101 to identify any connectivity issue between EDGE 110 and destination VM1 131 or VM3 133.

Figure 6:
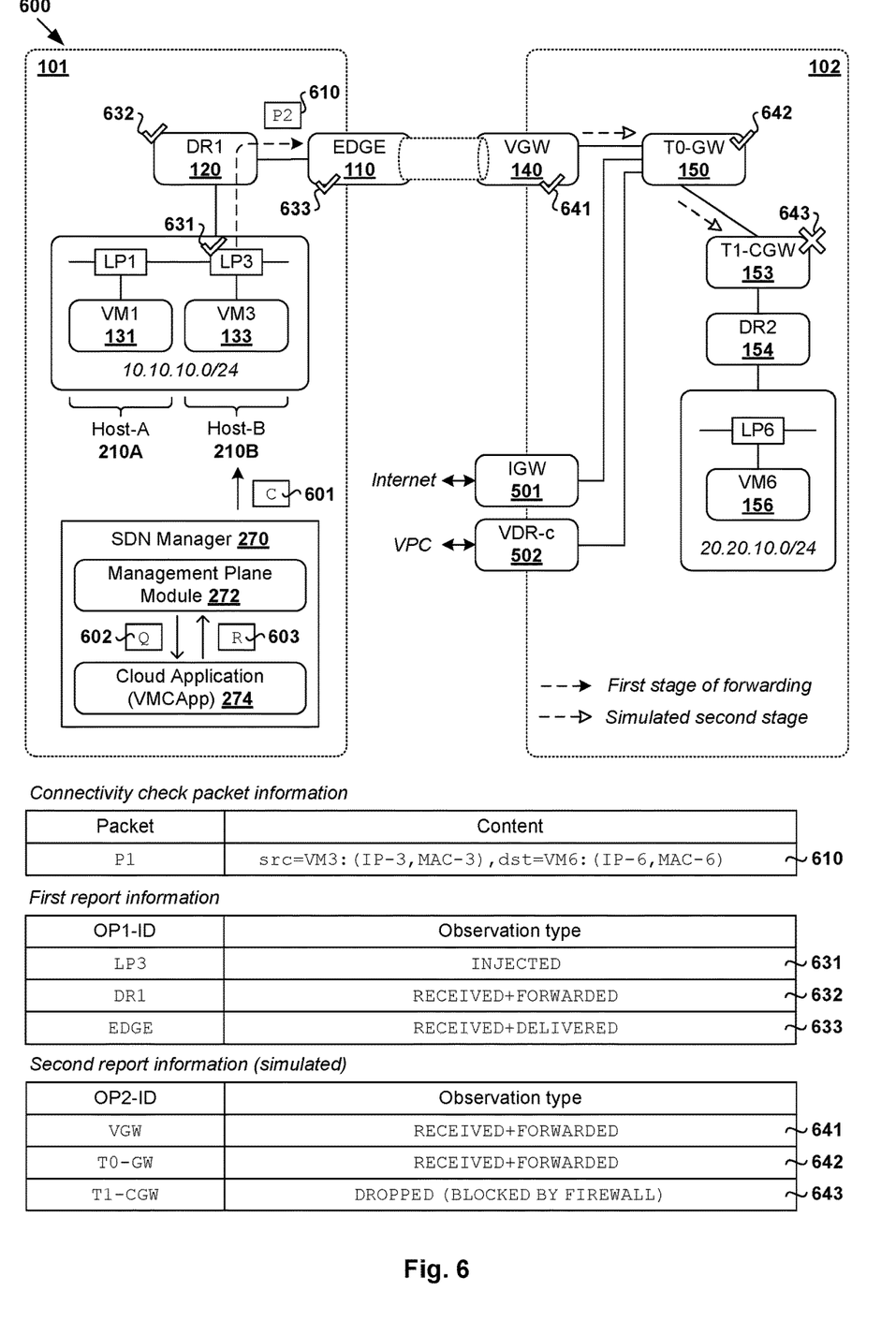
FIG. 6 is a schematic diagram illustrating a second example of cross-cloud connectivity check in an SDN environment.

Although described using cloud environments 101-102, it should be understood that examples of the present disclosure may be implemented for any suitable "first cloud environment" and "second cloud environment." For example in FIGS. 5-6, public cloud environment 102 may be connected with the Internet via an Internet gateway labelled as "IGW" 501, and another VPC supported by AWS via a gateway labelled "VDR-c" 502. Depending on the desired implementation, cross-cloud connectivity check may be performed to identify any connectivity issues between public cloud environment 102 and Internet/VPC. Additionally and/or alternatively, cross-cloud connectivity check may be performed to identify any connectivity issues between private cloud environment 101 and a different external cloud platform (not shown).

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-134, 155-156. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to implement simulation-based cross-cloud connectivity check according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

We claim:

1. A method for a computer system to perform simulation-based cross-cloud connectivity checking, the method comprising:
   in a first stage of the connectivity checking:
      injecting, in a first cloud environment, a connectivity check packet for forwarding from a first virtualized computing instance in the first cloud environment to a second virtualized computing instance in a second cloud environment; and
      obtaining first report information that corresponds to forwarding the connectivity check packet within the first cloud environment;
   in a second stage of the connectivity checking:
      simulating forwarding of the connectivity check packet within the second cloud environment to the second virtualized computing instance; and
      generating second report information that corresponds to the simulating forwarding of the connectivity check packet; and
   based on at least one of the first report information and the second report information, identifying a connectivity status between the first virtualized computing instance and the second virtualized computing instance.

2. The method of claim 1, wherein obtaining the first report information includes obtaining the first report information from one or more first observation points along a data path of the connectivity check packet in the first cloud environment, and wherein generating the second report information includes generating the second report information using one or more second observation points along a data path in the second cloud environment.

3. The method of claim 2, further comprising obtaining configuration information that controls behavior of the one or more second observation points in the second cloud environment, wherein the simulating forwarding of the connectivity check packet within the second cloud environment is based on the configuration information.

4. The method of claim 1, wherein the first cloud environment comprises a private cloud environment, and wherein the second cloud environment comprises a public cloud environment.

5. The method of claim 1, wherein the second stage of the connectivity checking is performed in response to the connectivity check packet not being dropped during the first stage of the connectivity checking to indicate no connectivity issue in the first cloud environment.

6. The method of claim 1, wherein the connectivity check packet comprises a first connectivity check packet, wherein the connectivity checking comprises a first connectivity checking for a first data path from the first cloud environment to the second cloud environment, and wherein the method further comprises performing a second connectivity checking for a second data path from the second cloud environment to the first cloud environment, by:
   simulating forwarding of the second connectivity check packet within the second cloud environment along the second data path; and
   in response to the simulating forwarding of the second connectivity check packet indicating no connectivity issue in the second cloud environment along the second data path, injecting a second connectivity check packet for forwarding within the first cloud environment along the second data path.

7. The method of claim 1, wherein the second stage of the connectivity checking is performed in response to the connectivity check packet being dropped, by an edge device that connects the first cloud environment to the second cloud environment, after completion of the first stage of the connectivity checking indicates that no connectivity issue is present in the first cloud environment.

8. A non-transitory computer-readable medium having instructions stored thereon, which in response to execution by a processor of a computer system, cause the processor to perform a method for simulation-based cross-cloud connectivity checking, wherein the method comprises:
   in a first stage of the connectivity checking:

injecting, in a first cloud environment, a connectivity check packet for forwarding from a first virtualized computing instance in the first cloud environment to a second virtualized computing instance in a second cloud environment; and obtaining first report information that corresponds to forwarding the connectivity check packet within the first cloud environment;

in a second stage of the connectivity checking:

simulating forwarding of the connectivity check packet within the second cloud environment to the second virtualized computing instance; and generating second report information that corresponds to the simulating forwarding of the connectivity check packet; and based on at least one of the first report information and the second report information, identifying a connectivity status between the first virtualized computing instance and the second virtualized computing instance.

9. The non-transitory computer-readable medium of claim 8, wherein obtaining the first report information includes obtaining the first report information from one or more first observation points along a data path of the connectivity check packet in the first cloud environment, and wherein generating the second report information includes generating the second report information using one or more second observation points along a data path in the second cloud environment.

10. The non-transitory computer-readable medium of claim 9, wherein the method further comprises obtaining configuration information that controls behavior of the one or more second observation points in the second cloud environment, and wherein the simulating forwarding of the connectivity check packet within the second cloud environment is based on the configuration information.

11. The non-transitory computer-readable medium of claim 8, wherein the first cloud environment comprises a private cloud environment, and wherein the second cloud environment comprises a public cloud environment.

12. The non-transitory computer-readable medium of claim 8, wherein the second stage of the connectivity checking is performed in response to the connectivity check packet not being dropped during the first stage of the connectivity checking to indicate no connectivity issue in the first cloud environment.

13. The non-transitory computer-readable medium of claim 8, wherein the connectivity check packet comprises a first connectivity check packet, wherein the connectivity checking comprises a first connectivity checking for a first data path from the first cloud environment to the second cloud environment, and wherein the method further comprises performing a second connectivity checking for a second data path from the second cloud environment to the first cloud environment, by:

simulating forwarding of the second connectivity check packet within the second cloud environment along the second data path; and in response to the simulating forwarding of the second connectivity check packet indicating no connectivity issue in the second cloud environment along the second data path, injecting a second connectivity check packet for forwarding within the first cloud environment along the second data path.

14. The non-transitory computer-readable medium of claim 8, wherein the second stage of the connectivity checking is performed in response to the connectivity check packet being dropped, by an edge device that connects the first cloud environment to the second cloud environment, after completion of the first stage of the connectivity checking indicates that no connectivity issue is present in the first cloud environment.

15. A computer system configured to perform cross-cloud connectivity checking the computer, the computer system comprising:

a processor; and a non-transitory computer-readable medium having stored thereon instructions that, which in response to execution by the processor, cause the processor to:

in a first stage of the connectivity checking:

inject, in a first cloud environment, a connectivity check packet for forwarding from a first virtualized computing instance in the first cloud environment to a second virtualized computing instance in a second cloud environment; and obtain first report information that corresponds to forwarding the connectivity check packet within the first cloud environment;

in a second stage of the connectivity checking:

simulate forwarding of the connectivity check packet within the second cloud environment to the second virtualized computing instance; and generate second report information that corresponds to the simulated forwarding of the connectivity check packet; and based on at least one of the first report information and the second report information, identify a connectivity status between the first virtualized computing instance and the second virtualized computing instance.

16. The computer system of claim 15, wherein the instructions that cause the processor to obtain the first report information cause the processor to obtain the first report information from one or more first observation points along a data path of the connectivity check packet in the first cloud environment, and wherein the instructions to cause the processor to generate the second report information cause the processor to generate the second report information using one or more second observation points along a data path in the second cloud environment.

17. The computer system of claim 16, wherein the instructions further cause the processor to obtain configuration information that controls behavior of the one or more second observation points in the second cloud environment, and wherein the simulated forwarding of the connectivity check packet within the second cloud environment is based on the configuration information.

18. The computer system of claim 15, wherein the first cloud environment comprises a private cloud environment, and wherein the second cloud environment comprises a public cloud environment.

19. The computer system of claim 15, wherein the second stage of the connectivity checking is performed in response to the connectivity check packet not being dropped during the first stage of the connectivity checking to indicate no connectivity issue in the first cloud environment.

20. The computer system of claim 15, wherein the connectivity check packet comprises a first connectivity check packet, wherein the connectivity checking comprises a first connectivity checking for a first data path from the first cloud environment to the second cloud environment, and wherein the instructions further cause the processor to perform a second connectivity checking for a second data path from the second cloud environment to the first cloud environment, by:

simulate forwarding of the second connectivity check packet within the second cloud environment along the second data path; and in response to the simulated forwarding of the second connectivity check packet indicating no connectivity issue in the second cloud environment along the second data path, inject a second connectivity check packet for forwarding within the first cloud environment along the second data path.

21. The computer system of claim 15, wherein the second stage of the connectivity checking is performed in response to the connectivity check packet being dropped, by an edge device that connects the first cloud environment to the second cloud environment, after completion of the first stage of the connectivity checking indicates that no connectivity issue is present in the first cloud environment.

* * * * *